United States Patent [19]

Kneafsey et al.

[11] Patent Number: 5,523,347

[45] Date of Patent: Jun. 4, 1996

[54] ONE-PART, AIR-ACTIVATABLE, FREE-RADICALLY POLYMERIZABLE COMPOSITIONS

[75] Inventors: Brendan Kneafsey, Lucan; John Guthrie, Naas; David P. Melody, Castleknock, all of Ireland

[73] Assignee: Loctite (Ireland) Limited, Tallaght, Ireland

[21] Appl. No.: 173,267

[22] Filed: Dec. 23, 1993

Related U.S. Application Data

[63] Continuation of Ser. No. 847,157, Mar. 5, 1992, abandoned.

[30]  Foreign Application Priority Data

| Mar. 6, 1991 | [IE] | Ireland | 0741/91 |
| Mar. 6, 1991 | [IE] | Ireland | 0742/91 |
| Feb. 13, 1992 | [IE] | Ireland | 920471 |

[51] Int. Cl.$^6$ .................... C08G 63/46; C08F 220/26
[52] U.S. Cl. .................... 525/49; 525/126; 525/309; 526/204; 526/217; 526/301; 526/314; 526/318.42; 526/318.43; 526/320
[58] Field of Search ............... 526/314, 318.42, 526/204, 320, 346, 347, 328, 328.5, 329, 264, 301; 523/176; 525/49, 126, 309

[56]  References Cited

U.S. PATENT DOCUMENTS

| 1,780,334 | 11/1930 | Burnett et al. |  |
| 2,478,066 | 8/1949 | van Peski. |  |
| 2,601,293 | 7/1952 | Howard. |  |
| 3,987,019 | 10/1976 | Gruber et al. | 526/328 |
| 3,988,507 | 10/1976 | Gruber et al. | 526/328 |
| 3,991,261 | 11/1976 | Gruber et al. | 526/328 |
| 4,287,255 | 9/1981 | Wong. |  |
| 4,395,301 | 7/1983 | Bauer | 156/307.5 |
| 4,395,361 | 7/1983 | Eickhoff et al. |  |
| 4,401,793 | 8/1983 | Chiao | 525/285 |
| 4,430,480 | 2/1984 | Melody et al. | 525/160 |
| 4,450,030 | 5/1984 | Melody et al. | 156/307.3 |
| 4,452,955 | 6/1984 | Boeder. |  |
| 4,855,373 | 8/1989 | Wolf et al. | 526/218.1 |
| 4,950,701 | 8/1990 | Okamura | 524/237 |
| 5,045,614 | 9/1991 | Buchholz et al. | 526/219.5 |

FOREIGN PATENT DOCUMENTS

| 0169702 | 1/1986 | European Pat. Off. | C08F 4/00 |
| 287796 | 3/1991 | Germany | G03C 1/68 |
| 040912 | 11/1976 | Japan. |  |
| 2087906 | 1/1982 | United Kingdom | C09J 3/14 |

*Primary Examiner*—Christopher Henderson
*Attorney, Agent, or Firm*—Vidas, Arrett & Steinkraus

[57]  ABSTRACT

A one-part, air-activatable, polymerizable composition comprising:
  (a) at least one free-radically polymerizable monomer, and
  (b) an activator system for effective polymerization of the free-radically polymerizable monomer, said activator system comprising at least one auto-oxidizable compound of a formula which includes the structure I:

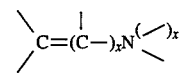

where x is 0 or 1, and where the lines representing unfilled valencies indicate bonds to carbon, hydrogen or hetero atoms, alone or in combination with a weak acid;
with the proviso that:
when x=0, the nitrogen atom in structure I is not bonded to a second nitrogen atom;
and when x=1 there is a structure I in the compound in which the >C=C< moiety does not form part of a phenyl ring;
with the proviso that the composition does not contain a peroxide, or a peroxide precursor which produces peroxide in the absence of air or any ingredient which is a significant source of radicals in the absence of air.

Preferred auto-oxidizable compounds are selected from the group consisting of partially hydrogenated pyridines, condensation products of cyclic ketones and ureas, Schiff's bases, indoles, pyrroles, imidazoles, piperazines, carbazoles, tetrahydroquinolines, and substituted derivatives thereof, particularly dihydropyridines.

The composition may also contain a soluble ionic salt, particularly a cobalt or iron salt.

The compositions as described are stable on storage in the absence of air, are activated by exposure to air, and will then cure in either the presence or absence of air.

23 Claims, No Drawings

ONE-PART, AIR-ACTIVATABLE, FREE-RADICALLY POLYMERIZABLE COMPOSITIONS

This is a continuation of application Ser. No. 07/847,157, filed on 05 Mar. 1992 now abandoned.

BACKGROUND OF THE INVENTION a) Field of the Invention

The invention relates to air-activatable polymerisable compositions and their use. The compositions are suitable for use as one-component systems for forming polymers, requiring no primers. The compositions are useful as adhesives, sealants, surface coatings, moulding resins and composite matrices, for example. These compositions are particularly suitable for use as thread-locking compounds, e.g. for cementing nuts to threaded shafts, bushes to bush housings and the like.

b) Description of the Related Art

The cure of acrylic adhesives is initiated by a two-part redox system. The first part, the initiator, is normally present in the base component of the adhesive and the second part is present in the accelerator or curative component. One widely used curative is the reaction product of aniline and n-butyraldehyde. The reaction product was first known from U.S. Pat. No. 1,780,334 assigned to E.I. Du Pont DeNemours and Co. The condensation of aniline and n-butyraldehyde results in many products, some having complex structures. However it appears that the major component and active ingredient is a substituted dihydropyridine (DHP).

An adhesive composition which can be formulated either as a two-part system or as a system utilising a primer is disclosed in U.S. Pat. No. 3,890,407, assigned to E.I. Du Pont DeNemours and Co. The composition comprises a sulphur-bearing component selected from chlorosulphonated polyethylene and a mixture of sulphonyl chloride with chlorinated polyethylene in at least one polymerisable vinyl monomer and an accelerator comprising a primary amine-aldehyde condensation product. U.S. Pat. No. 4,112,013 also of E.I. Du Pont DeNemours and Co. which was divided from U.S. Pat. No. 3,890,407 specifies that the chlorosulphonated polyethylene is made from branched polyethylene having a melt index of about 100, the chlorosulphonated polyethylene containing about 43% chlorine by weight and about 34 mmoles of sulphonyl chloride per 100 grams of polymer and the composition may also comprise a mixture of methylmethacrylate, glacial methacrylic acid and ethyleneglycol dimethacrylate. A further U.S. Pat. No. 4,106,971, also divided from U.S. Pat. No. 3,890,407, relates to a method of bonding two surfaces comprising the above disclosed adhesive compositions.

A bonding accelerator containing a condensation reaction product of an aldehyde and a primary or secondary amine is known from U.S. Pat. No. 3,599,438, assigned to Loctite Corporation, together with a reducing activator comprising either a sulphur-containing free radical accelerator or a compound containing an oxidizable transition metal. Such a condensation reaction product is also known for use in conjunction with a polymerisable acrylate ester monomer and a peroxy polymerisation initiator (U.S. Pat. No. 3,616, 040 also of Loctite Corporation).

U.S. Pat. No. 4,430,480, assigned to Loctite Corporation relates to an adhesive composition which comprises a first part comprising a solution of chlorosulphonated polyethylene in at least one polymerisable vinyl monomer, a poly-merisation catalyst which comprises at least one free-radical initiator and a second part comprising an activator composition which consists of at least 70% of the condensation reaction product formed between butyraldehyde and aniline.

An improved adhesive composition of this type, enriched in N-phenyl-3,5-diethyl-2-propyl-1,2-dihydropyridine to a concentration of at least about 70% by weight of the condensation reaction products is known from U.S. Pat. No. 4,430,480.

All of the above compositions based on aldehyde-amine condensation reaction products are, however, two-part systems.

British Patent Specification No. 1113722 of Minnesota Mining and Manufacturing Company discloses aerobic compositions which are polymerisable in the presence of a free radical catalyst which comprises one or more mono- and/or bis-acrylate and/or methacrylate monomers which are blended with from 0.05 to 6% by weight of the monomer of a triaryl borane complex. British Patent Specification No. 1251737 of Toyo Soda Manufacturing Company Limited discloses the polymerisation of a vinyl monomer, chloroprene or methyl methacrylate in the presence of a catalyst comprising a trialkyl boron compound and a chloro hydrocarbon mixed in a molar ratio of 1:0.2 to 1:8.0.

The polymerisation of vinyl monomers using catalysts which are either diborane adducts or oligomers based on monomer units which contain at least two borane atoms are disclosed in U.S. Pat. No. 4,167,616 assigned to Rohm and Haas Company. The compositions also include an oxygen source.

U.S. Pat. No. 4,515,724 assigned to Henkel Kommanditgesellschaft Auf Aktien relates to boron alkyl compounds as initiators of free-radical polymerisation, the compounds being esters of a fatty acid or fatty alcohol having at least one boryl radical or organoboron radical attached thereto.

European Patent Application No. 0078994 A1 of Henkel KgaA describes an air-activatable starter system for the polymerisation of olefinic compounds, based on organoboron compounds with improved storage stability even on admission of air, which consists of a homogeneous mixture of at least one organo-boron compound activatable by admission of air with at least one organic oligomer or polymer which at room temperature is fluid to solid and which is inert towards the organo-boron compound.

The majority of these borane compositions have been found to be "two part" systems with limited pot lives. Where one-component adhesives are described, difficulties are encountered in formulation and obtaining adequate stability.

An adhesive composition which is described as being polymerisable either aerobically or anaerobically is disclosed in U.S. Pat. No. 4,348,503, and U.S. Pat. No. 4,429, 088 divided therefrom, of Bachmann, and comprises an acrylic ester monomer capable of free-radical polymerisation and a monomeric polyacrylate ester prepolymer together with a catalyst system which comprises an aromatic perester free-radical precursor, an organic acid and a soluble compound of a transition metal cure accelerator. However this composition requires a separate activator such as an amine-aldehyde condensate.

U.S. Pat. No. 4,452,955, assigned to Minnesota Mining and Manufacturing Company, discloses an adhesive composition comprising a polymerisable monomer having at least one alpha, beta-unsaturated carboxyl functionality and as an accelerator an organic sulphimide or perfluroalkylsulphonanilide, together with an inhibitor of free-radical polymerisation to retard polymerisation of the unsaturated carboxyl functionality on contact with the accelerator, and a condensation reaction product of an aldehyde and a primary or secondary amine.

Free radical polymerizable compositions are disclosed in European Patent Specification No. 0,356,875 of Henkel KGA. These comprise ethylenically unsaturated, polymerizable compounds together with an activator system which can be initiated by oxygen and water, comprising an N-alkyl-substituted tert-arylamine with at least one aliphatic CH bond in the alpha position, a metal compound generally used for accelerating the drying of unsaturated oil and which is at least partially soluble in the composition, and a compound of a weakly acidic carboxylic acid having a pKa value of no less than about 0.9, which can be hydrolyzed to a free carboxylic acid on contact with moisture.

The N-alkyl-substituted tert.-arylamines correspond in particular to the general formula:

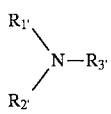

in which $R_1$, is an optionally substituted aryl radical, more especially an optionally alkyl-substituted phenyl radical, $R_2$, has the same meaning as $R_1$, or is an optionally substituted, linear or branched alkyl radical and $R_3$, is a linear or branched alkyl radical which may be substituted, but contains at least one hydrogen atom in the alpha-position to the nitrogen.

These compositions depend on the action of both water and oxygen to effect a cure reaction. As such their formulations are very dependant on humidity conditions.

WO91/10687-A of Henkel KGaA published after the priority date of this Application describes radical-cured multicomponent mixtures stable in the absence of air which contain alkyl, cycloalkyl and/or aryl hydrazones of aldehydes and/or ketones as initiators which form hydroperoxides.

SUMMARY OF THE INVENTION

It is an object of the present invention to provide a one-part polymerisable composition which is stable on storage in the absence of air, which is activated by exposure to air and which then cures in either the presence or absence of air.

According to the present invention there is provided a one-part air-activatable polymerisable composition comprising:

(a) at least one free-radically polymerisable monomer, and (b) an activator system for effective polymerisation of the free-radically polymerisable monomer, said activator system comprising at least one auto-oxidisable compound of a formula which includes the structure I:

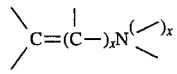   I where x is 0 or 1, and where the lines representing unfilled valencies indicate bonds to carbon, hydrogen or hetero atoms, alone or in combination with a weak acid;
with the proviso that:
when x=0, the nitrogen atom in structure I is not bonded to a second nitrogen atom;
and when x=1 there is a structure I in the compound in which the C=C moiety does not form part of a phenyl ring;
with the proviso that the composition does not contain a peroxide, or a peroxide precursor which produces peroxide in the absence of air or any ingredient which is a significant source of radicals in the absence of air.

The presence of a weak acid is generally preferred in order to achieve a satisfactory rate of auto-oxidation for most of the auto-oxidisable compounds exemplified herein. However it has been observed that certain of the auto-oxidisable compounds, for example the condensation products of urea and cyclic ketones described herein, are air-activated sufficiently well in the absence of acid, although the rate of activation is slower than in the presence of acid. A slower rate of activation and therefore a slower rate of cure of the composition may be desirable in some end-use applications. Nevertheless the presence of a weak acid is generally preferred, even in the case of auto-oxidisable compounds which react with oxygen in the absence of acid, in order to improve solubility of the auto-oxidisable compound in the monomer.

The composition will generally also comprise one or more soluble ionic salts. Preferred ionic salts are metal salts of the type generally used in oil drying technology. The metals should have several valency states and suitable metal salts are those of multivalent metals, especially transition metals. The metal salt or salts must be at least partially soluble in the composition, and may be present in the composition in an effective amount which is generally in a range of between about 1 and about 1,000 parts per million, preferably about 30–300, more preferably 3 to 200 ppm. Alternatively a metal salt in the environment, e.g. on the substrate to which the composition is applied, may participate in initiation of the polymerisation.

The presence of a metal salt is desirable, particularly for improving storage stability of the compositions. An excess of metal salt can interfere with air-activation of the compositions. Iron, cobalt, manganese and vanadium salts are preferred. In addition, compounds of these metals can be mixed with each other, or with one or more other metallic components such as lead, cerium, copper, calcium, barium, zinc and/or zirconium. A mixture of two ionic salts, e.g. salts of cobalt and iron, may have a synergistic effect in certain proportions e.g. a Co:Fe ratio from 9:1 to 1:1. Ionic salts capable of increasing the ionic strength of the formulation also show activity in air activatable adhesive formulations. Typical of these materials are quaternary alkyl ammonium salts, and organic soluble salts of tin, calcium and aluminium.

Metal naphthenates or metal acetyl acetonates are generally soluble in the composition, but other salts or organometallics may be used if they are sufficiently soluble.

The free-radically polymerisable monomer may be selected from olefinically unsaturated systems such as acrylates, methacrylates, styrene, maleate esters, fumarate esters, unsaturated polyester resins, alkyd resins, thiol-ene compositions, and acrylate, methacrylate, or vinyl terminated resins including silicones and urethanes. Suitable acrylates and methacrylates are those used in polymerisable systems such as disclosed in U.S. Pat. No. 4,963,220 of Bachmann et. al., and U.S. Pat. No. 4,215,209 of Ray-Chaudhuri et al. Particularly preferred are hydroxyl-containing methacrylates especially hydroxyalkyl methacrylates such as hydroxypropyl methacrylate. Also preferred are methylmethacrylate, polyfunctional methylacrylates, silicone diacrylates and polyfunctional acrylated urethanes of the type known to be useful in formulating adhesives (e.g. as disclosed in U.S.

Pat. No. 4,092,376 of Douek et al) or a thiol-ene (e.g. as disclosed in U.S. Pat. Nos. 3,661,744, 3,898,349, 4,008,341 or 4,808,638).

The auto-oxidisable compound may be defined as an autox, capable of reacting with atmospheric oxygen by a free-radical mechanism. The auto-oxidisable compound may have the general formula II:

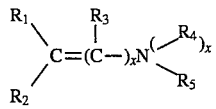
II where x is 0 or 1 and $R_1$, $R_2$, $R_3$, $R_4$ and $R_5$, which may be the same or different, are independently selected from hydrogen, hydrocarbyl and heterohydrocarbyl groups, silyl groups, and substituted derivatives of any of the foregoing, and any two of the groups $R_1$ to $R_5$ may together form a mono- or poly-cyclic ring structure, which may optionally be a fused ring structure, and which in turn may be substituted, with the proviso that none of the groups $R_1$ to $R_5$ comprise or contain a group which is known to interfere with polymerisation, and with the same provisos as defined above with respect to the compound of a formula which includes the structure I.

Preferably $R_2$ and $R_5$ form a ring structure such that the auto-oxidisable compound has the general formula IIa

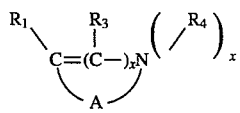
IIa wherein A is a divalent hydrocarbyl or heterohydrocarbyl group which may optionally have a cycloaliphatic or aromatic ring fused thereto and which may be substituted.

The groups $R_1$ and $R_3$ may also suitably form a ring structure.

The term "hydrocarbyl" as used herein includes (i) straight chain or branched aliphatic groups including alkyl, alkenyl and alkynyl, preferably containing from 1 to 20, more preferably from 1 to 10, most preferably from 1 to 5 carbon atoms; and alkylene and alkenylene groups forming part of a ring structure which preferably contains from 3 to 30, more preferably 5 to 20 carbon atoms;

(ii) aromatic groups including aryl, alkaryl and aralkyl groups.

The term "heterohydrocarbyl" as used herein includes hydrocarbyl groups as described above interrupted by a hetero atom selected from oxygen, nitrogen or sulphur.

The term "substituted" or "substituted derivative" as used herein includes the appropriate group substituted with one or more oxygen, nitrogen, sulphur or halogen atoms or atom-containing moieties, or with one or more hydrocarbyl or heterohydrocarbyl groups, which in turn may be substituted with one or more oxygen, nitrogen, sulphur or halogen atoms or atom-containing moieties. The halogen may be chlorine, bromine, fluorine or iodine. Exemplary of suitable $R_1$–$R_5$ groups as well as substituents on a ring structure are hydrogen, $C_1$–$C_5$ alkyl, $C_1$–$C_5$ alkoxy, phenyl, alkoxyphenyl, benzyl, cyclohexyl, amide or trialkyl silyl groups.

Suitable auto-oxidisable compounds include partially hydrogenated pyridines, condensation products of cyclic ketones and ureas, Schiff's Bases, indoles, pyrroles, imidazoles, piperazines, carbazoles and tetrahydroquinolines and substituted derivatives thereof. Particularly preferred are dihydropridines having a general formula selected from III:

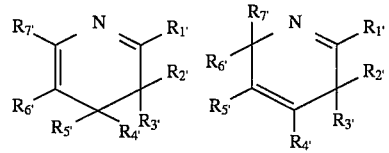

III (i)    III (ii)

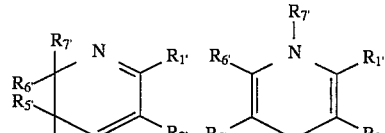

III (iii)    III (iv)

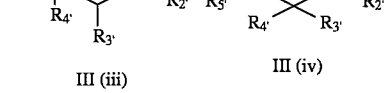

III (v)

wherein $R_1'$ to $R_7'$ have the same meanings and provisos as $R_1$ to $R_5$ above. Compounds of formula III (iv) and III (v) are preferred, $R_7'$ preferably being other than hydrogen, and more preferably being an electron-donating group, or the condensation products of ureas and cyclic ketones having a general formula IIIa:

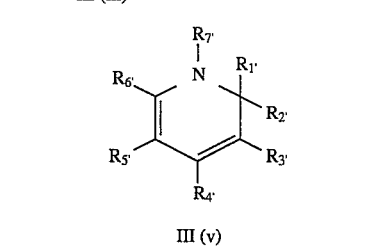
IIIa wherein n=4, 5, 6, or 7 and $R_a$ and $R_b$ are as defined for $R_1$ to $R_5$ above, or Schiff's Bases of the formula:

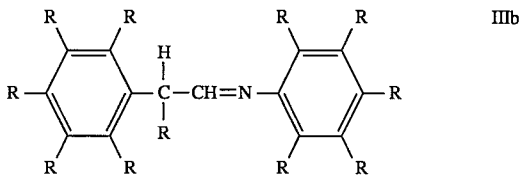
IIIb where the R's which may be the same or different are selected from H, alkyl, alkoxy or aromatic groups, and substituted derivatives thereof, wherein alkyl groups or moieties preferably contain from 1 to 20, more preferably from 1 to 10, most preferably from 1 to 5 carbon atoms, and aromatic groups include aryl, alkaryl and aralkyl groups.

The following are examples of compounds which are suitable for use in the compositions of the invention as auto-oxidisable compounds:

Dihydropyridines

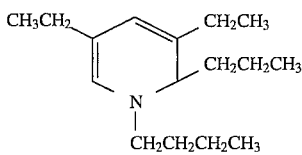

N-butyl-2-propyl-3,5-diethyl-1,2-dihydropyridine;

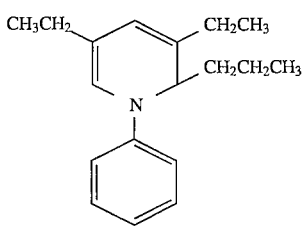

N-phenyl-2-propyl-3,5-diethyl-1,2-dihydropyridine;

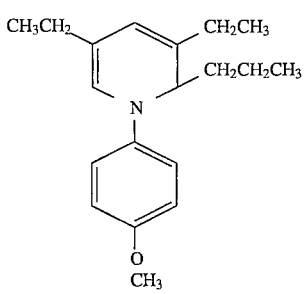

N-(4-methoxyphenyl)-2-propyl-3,5-diethyl-1,2-dihydropyridine.

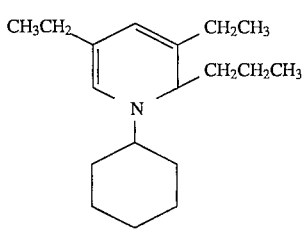

N-(cyclohexyl)-2-propyl-3,5-diethyl-1,2-dihydropyridine.

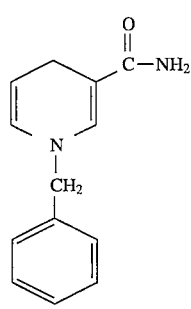

N-benzyl-1,4-dihydronicotinamide;

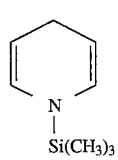

N-trimethylsilyl-1,4-dihydropyridine;

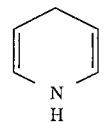

1,4-dihydropyridine;

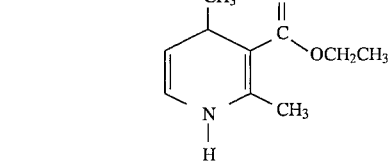

ethyl-2,4-dimethyl-1,4-dihydronicotinate;

Indoles

A compound of formula X

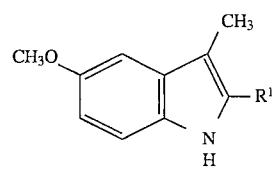

(i) $R^1$=$CH_3$, 5-methoxy-2,3-dimethylindole, (ii) $R^1$=phenyl, 5-methoxy-2-phenyl-3-methylindole (J. Chem. Soc. [1954] p4139, R. J. Beer et al.);

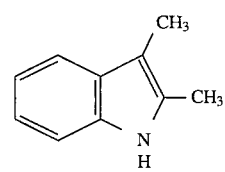

2,3-dimethyl-indole (same ref.);

Pyrroles

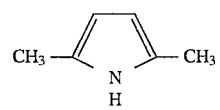

2,5-dimethylpyrrole (J.C.S. Chemm. Commun. [1966] p198 C. O. Bender & R. Bonnett;

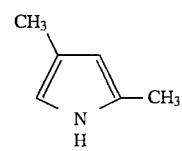

2,4-dimethylpyrrole (Org. Synthesis Vol II p218.);

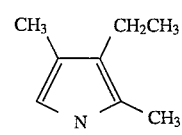

2,4-dimethyl-3-ethyl-pyrrole (Liebigs. Ann. Chem. p527, 1 [1937] Metzer, W. & Fischer, H);

Imidazoles

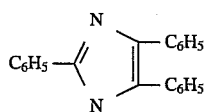
XV 2,4,5-triphenylimidazole (Compt. Rend. 261, p3133 [1965] C. DuFraiser & G. Rio.);

Piperazines

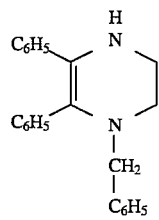
XVI 1-benzyl-2,3-diphenyl dihydropiperazine (J. Org. Chem. (20) 1513 [1955] C. D. Lunsford & R. E. Lutz.);

Tetrahydracarbazoles

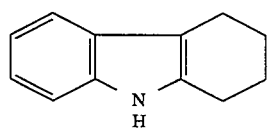
XVII 3,4,5,6-tetrahydracarbazole (J. Amer. Chem. Soc. 73 p2186 [1951] & J. Amer. Chem. Soc. 73 p2196 [1951].);

Schiff Bases

A compound of formula

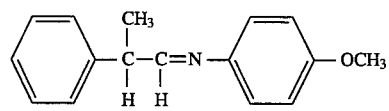
XIX

J. Amer. Chem. Soc. 78, 2873 (1956) of Witkop, B.];

Hydroquinolines

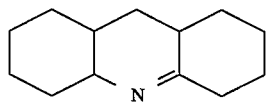
XX $\Delta^{10}$ Dodecahydroacridine, [Khun. Geterotsiki. Soedin 2, 373–4, (1969) of Kaminstii, V. A., et al];

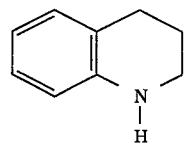
XXA 1,2,3,4-tetrahydroquinoline.

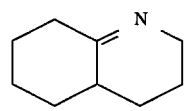
XXI $\Delta^{19}$ Octahydroquinoline, [J. Amer. Chem. Soc. 77, 6595 (1955) of Cohen, L. A. and Witkop, B.[;

Tetrahydropyridines

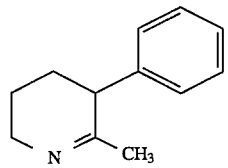
XXII 2-methyl-3-phenyl-3,4,5,6-tetrahydropyridine, [J. Org. Chemistry, 28, 3468, (1963) of Parcell, R. F. & Hank, F. P.];

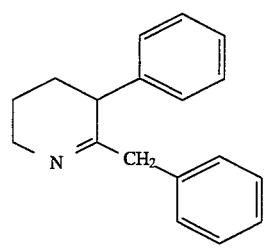
XXIII 2-benzyl-3-phenyl-3,4,5,6-tetrahydropyridine;

Condensation Products of Urea and Cyclic Ketones

Spirolactams of the formula XXIV

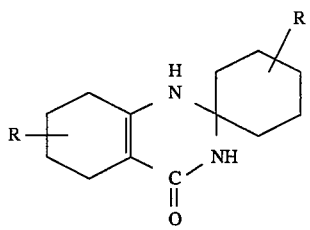
XXIV wherein the R's which may be the same or different are as defined above; exemplified by a compound of formula:

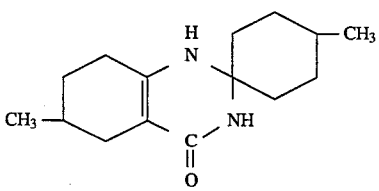
XXV

Canadian Patent No. 667,356 of McKay et al and G. Zigeuner et al Monatschefte fur Chemie, 101 (1970), 1547–58.]

The auto-oxidisable compound will generally be present in an effective amount for effecting polymerisation of the composition upon exposure to atmospheric oxygen. Such effective amount is generally within the range of from about 0.1 to about 20%, preferably from about 0.1 to about 10%, more preferably from about 0.5 to about 5%, based on the weight of the polymerisable composition.

Weak Acid

The weak acid when required is an acid other than a mineral acid. The pKa of the weak acid normally is no lower than about 0.5 with the preferred limit being about 0.9. The upper limit is approximately 13, more preferably 11.5. However, carboxylic acids which have a pKa of up to about 8, preferably 6 or 7 are particularly suitable.

The carboxylic acids may contain one or more carboxyl groups, suitably 1 to 4 and more preferably 1 or 2 carboxyl groups. Suitable aliphatic carboxylic acids are $C_{1-18}$ and preferably $C_{1-10}$ monocarboxylic acids.

The choice of the acid depends to a large extent on the auto-oxidisable material being used. Suitable acids may be monobasic or polybasic. Typical but not limiting examples of suitable acids are formic acid, acetic acid, propionic acid, maleic acid, malic acid, fumaric acid, acrylic acid and copolymers thereof, methacrylic acid and copolymers thereof, pyruvic acid, itaconic acid, nadic acid, benzoic acid, phthalic acids, cinnamic acid, trichloroacetic acid and saccharin. The effective amount of the acid is generally within the range from about 0.1 to about 20%, preferably from about 0.1 to about 10%, more preferably from about 0.5 to about 5% based on the weight of the polymerisable composition.

The composition may optionally further comprise reducing agents, thickeners, fillers, pigments and free radical polymerisation stabilisers.

Suitable reducing agents may be, but are not limited to, acetylphenylhydrazine, tetramethylthiourea or thiocaprolactam.

Polymeric thickeners may be present in the compositions in a minor amount, up to about 50%, and may be thickeners such as a polymer or prepolymer of low or high molecular weight. Suitable polymeric thickeners are a commercially available methacrylate polymer sold by E.I. du Pont de Nemours and Company, under the trademark Elvacite or by Rohm and Haas under the Trade Mark Ryloid, as well as styrene-methyl methacrylate co-polymers and polybisphenol A maleate (sold by ICI Americas Inc. under the trademark Atlac). It is also possible to add inert filling materials such as finely divided silica, fumed silica (treated or untreated), montmorillonite, clay, bentonite and the like. The use of micronized silica would result in a paste-like thixotropic composition.

Additionally, it is conventional to include in adhesive formulations certain "inert" fillers such as wood flour, glass fibres, cotton linters, mica, alumina, silica and the like to modify viscosity, improve impact resistance and for other purposes. Such fillers could be incorporated in the formulations of the present invention. Small percentages of silane monomers could also be added to increase moisture resistance, as well as to enhance bonding of an adhesive to glass and similar surfaces. Other substances such as dyes, fire retarders, stabilizers such as quinones and hydroquinones, thixotropes, plasticizers, antioxidants, and the like may also be included, although such additives may often be furnished in the principal ingredients, making their separate introduction unnecessary.

Peroxides, or peroxide percursors which produce peroxide in the absence of air, or any ingredient which is a significant source of radicals in the absence of air, should not be included in the compositions, so that polymerisation of the free-radically polymerisable monomer does not commence until it is exposed to oxygen.

The compositions of the present invention may suitably comprise 0.1 to 20% by weight of the auto-oxidisable compound, 0.1% to 20% by weight of the weak acid (if present) and at least 10% by weight of the free-radically polymerisable monomer, optionally with the ionic salt, thickeners, fillers, pigments, reducing agents and/or stabilisers, the total constituents adding up to 100%.

The invention also provides a method of bonding two substrates comprising coating at least one substrate with a composition as defined above, exposing the composition to oxygen for sufficient time to activate polymerization, and bringing the two substrates together. Typically at least about 5 seconds, but preferably at least about 30 seconds exposure to air would be suitable.

Furthermore the invention provides a method of forming a polymer, for example in topical coatings, encapsulation, moulding and the like, comprising exposing to oxygen for sufficient time to activate polymerization a composition as defined above. Typically at least about 5 seconds, but preferably at least about 30 seconds exposure to air would be suitable.

The above-described compositions are stable when prepared in the absence of air. Exposure to air results in the polymerisation of the composition, the polymerisation being sustained in the presence or absence of air once the initial exposure to air has taken place. Typically the exposure to air should be for at least about 5 seconds, preferably not less than 30 seconds, more preferably 1 to 5 minutes.

The composition may be agitated during its exposure to oxygen to accelerate activation by introducing oxygen into the composition. The purpose of agitation is to increase the surface area of the composition exposed to the oxygen. For example the composition may be applied to a substrate in finely divided form e.g. by spraying or in the form of a foam. The composition may be packaged in and/or dispensed from a container having a nozzle which entrains air as the composition is dispensed e.g. an aerosol container or pump-action aspirator. In addition, or alternatively, the composition may be agitated on the substrate e.g. by stirring. Agitation of the composition also improves cure-through-volume (CTV) in a layer having significant depth.

The invention further provides a composition as described above packaged in an aerosol container or pump-action aspirator.

The compositions of the invention are true one-component polymerizable compositions and are thus much simpler to use than two-component compositions, and yet they have good stability when formulated under oxygen-free conditions and stored in a sealed container under inert gas. A further advantage of the compositions is that their mechanism of polymerization is independent of the substrate and they thus have a wide range of applications. In addition it is possible to achieve a more uniform distribution of cure in a thick bond line. Additionally, the compositions have rapid fixture times and good bond strengths.

DESCRIPTION OF THE PREFERRED EMBODIMENTS

The invention may be more fully understood with reference to the following examples.

EXAMPLE 1

An adhesive composition was prepared by formulating hydroxypropyl methacrylate (10 g), acrylic acid (0.5 g) with 0.5 g of a cobalt naphthenate solution comprising 20 parts methyl methacrylate (20 g), one part of a 6% cobalt naphthenate solution in hydrocarbon oil (1 g). This formulation was added to an aluminium tube and exposed to a steady stream of argon gas through a syringe needle for 2 minutes. N-phenyl-2-propyl-3,5-diethyl-1,2-dihydropyridine (0.5 g) was added to the formulation under an atmosphere of argon. The aluminium tube was then sealed by crimping, thus trapping argon gas in the head space above the formulation. The aluminium tube was shaken for 10–20 seconds to ensure thorough mixing of the formulation components.

The adhesive composition was tested as follows: samples of the adhesive were squeezed from the aluminium tube and spread onto grit blasted mild steel laps (4×1 inches) to form a film of approximately 0.1 mm in depth and exposed to air for a measured interval (open time). Then the laps were brought together to form an adhesive joint with 0.5 inch overlap, excluding air. As a result of activation by exposure to air, rapid fixturing was observed and the exact 3 kg fixture times from the time of assembly of the laps (ASTM 609) were measured for a range of open times and recorded in Table 1.

TABLE 1

| OPEN TIMES (MINUTES) | 3 kg FIXTURE TIMES (MINUTES) |
|---|---|
| 0.5 | 4.5 |
| 1 | 3.0 |
| 2 | 2.0 |
| 3 | 1.5 |
| 4 | 1.5 |
| 5 | 1.5 |
| 10 | 12.0 |
| 20 | 14.0 |
| 30 | 14.0 |

The bond strength data (tested according to ASTM 603) for bonds assembled using the above procedure and allowed to cure for 24 hours are shown in Table 2.

TABLE 2

| OPEN TIMES (MINUTES) | TENSILE SHEAR BOND STRENGTHS (N/mm$^2$) |
|---|---|
| 1 | 14.6 |
| 2 | 12.4 |
| 3 | 11.6 |
| 4 | 10.7 |
| 5 | 12.6 |

EXAMPLE 2

An adhesive formulation was prepared using an identical procedure to that outlined in Example 1 except that N-butyl-2-propyl-3,5-diethyl-1,2-dihydropyridine (0.5 g) was used instead of N-phenyl-2-propyl-3,5 -diethyl-1,2-dihydropyridine. Using this formulation 3 kg fixture times of 2.5 minute were obtained with 2 minutes open times and 24 hour bond strengths of 9.85 N/mm$^2$.

EXAMPLE 3 (COMPARATIVE)

A formulation, prepared using the procedure outlined in Example 1, comprising hydroxypropyl methacrylate (10 g), acrylic acid (0.5 g) and 0.3% cobalt naphthenate in methylmethacrylate (0.5 g) was found to be inactive as an adhesive when tested using the procedures outlined in example 1. The formulation failed to give 3 kg fixtures and gave zero 24 hour bond strengths.

EXAMPLE 4 (COMPARATIVE)

A formulation prepared using the procedure outlined in Example 1, comprising hydroxypropyl methacrylate (10 g), 0.3% cobalt naphthenate in methylmethacrylate (0.5 g) and N-phenyl-2-propyl-3,5-diethyl-1,2-dihydropyridine (0.5 g) was found to be inactive as an adhesive, failed to give 3 kg fixtures and gave zero 24 hour bond strengths when tested as described in Example 1.

EXAMPLE 5

Following the procedure outlined in Example 1 two formulations were prepared comprising hydroxypropyl methacrylate (10.0 g), acrylic acid (0.5 g), 0.3% cobalt naphthenate in methylmethacrylate (0.5 g) and either 0.3 g (composition a) or 0.2 g (composition b) N-phenyl-2 -propyl-3,5-diethyl-1,2-dihydropyridine.

Both these formulations when activated by exposure to air gave fixture times and 24 hour bond strengths as follows:

(Composition a) Bond Strength: 12.5 N/mm$^2$ Fixture time: 2 minutes (Composition b) Bond Strength: 9.3 N/mm$^2$ Fixture time: 3 minutes

EXAMPLE 6

A series of formulations were prepared using the procedure outlined in Example 1, containing the following components:

| | Formulation (a) | Formulation (b) | Formulation (c) |
|---|---|---|---|
| hydroxypropyl methacrylate | 8 g | 5 g | 2 g |
| methyl methacrylate | 2 g | 5 g | 8 g |
| N-phenyl-2-propyl-3,5-diethyl-1,2-dihydropyridine | 0.5 g | 0.5 g | 0.5 g |
| 0.3% cobalt naphthenate in methyl methacrylate | 0.5 g | 0.5 g | 0.5 g |
| acrylic acid | 0.5 g | 0.5 g | 0.5 g |

When these formulations were exposed to air and activated as in Example 1 fixture times and bond strengths as listed in Table 3 were obtained.

TABLE 3

| | Formulation (a) | Formulation (b) | Formulation (c) |
|---|---|---|---|
| 3 kg fixture times(mins) | 2.5 | 2.0 | 1.5 |
| 24 hour bond strengths (N/mm$^2$) | 11.2 | 12.4 | 5.6 |

EXAMPLE 7

A formulation was prepared using the procedure outlined in Example 1 containing hydroxypropyl methacrylate (5.0 g), 50/50 polymethyl methyacrylate (low molecular weight)/methyl methacrylate solution (5.0 g), acrylic acid (0.5 g), 0.3% cobalt naphthenate in methylmethacrylate (0.5 g) and N-phenyl-2-propyl-3,5-diethyl-1,2-dihydropyridine (0.5 g). This formulation was activated by exposure to air and used to assemble bonds as in Example 1. Fixture times of 4.5 minutes and 24 hour bond strengths of 9.7 N/mm$^2$ were obtained.

EXAMPLE 7(b)

A formulation was prepared using the procedure outlined in Example 1, comprising hydroxypropyl methacrylate (8.0 g), a polyfunctional acrylated polyurethane of a type known to be useful for formulating adhesives (2.0 g), acrylic acid (0.5 g), 0.3% cobalt naphthenate in methyl methacrylate (0.5 g) and N-phenyl-2-propyl- 3,5-diethyl-1,2-dihydropyridine (0.5 g). This formulation when tested as described in Example 1 gave fixture times of 2 minutes.

EXAMPLE 8

A series of formulations were prepared by the procedure outlined in Example 1, comprising hydroxypropyl methacrylate (10 g), N-phenyl-2 -propyl-3,5-diethyl-1,2-dihydropyridine (0.5 g), 0.3% cobalt naphthenate in methyl methacrylate (0.5 g) and 0.5 g of each of the acids listed in Table 4.

The fixture times obtained when these formulations were tested as described in Example 1 are shown in Table 4.

TABLE 4

|  | pKa | 3 kg Fixture time (min) |
|---|---|---|
| Trichloroacetic acid | 0.7 | 1.5 |
| Cyanoacetic acid | 2.45 | 2.0 |
| Salicylic acid | 2.97 | 2.5 |
| Benzoic acid | 4.19 | 2.5 |
| Acrylic acid | 4.25 | 2.5 |
| Acetic acid | 4.75 | 2.5 |
| Saccharin | 11.46 | 2.5 |

EXAMPLE 9

A series of formulations were prepared by the procedure outlined in Example 1, comprising hydroxypropyl methacrylate (10 g), 0.3% cobalt naphthenate in methyl methacrylate (0.5 g), N-phenyl-2-propyl-3,5 -diethyl-1,2-dihydropyridine (0.5 g) and acrylic acid added at a range of weights as shown in Table 5.

These formulations were activated by exposure to air and used to assemble adhesive bonds as in Example 1. The bonds strengths obtained after 24 hours cures are illustrated in Table 5 for the respective formulations.

TABLE 5

| Acrylic Acid Level | Bond Strengths (N/mm$^2$) |
|---|---|
| (a) 1.0 g | 17.82 |
| (b) 0.4 g | 10.64 |
| (c) 0.3 g | 3.49 |
| (d) 0.2 g | 3.50 |
| (e) 0.1 g | 3.04 |
| (f) 0 g | 0 |

EXAMPLE 10

Formulations were prepared using identical procedures to those employed for Example 1 except that the cobalt naphthenate was replaced by (a) iron naphthenate (b) copper naphthenate or (c) manganese naphthenate.

When these formulations were used to assemble bonds as described in Example 1 the following 24 hour bond strengths were obtained:

(a) 12.7 N/mm$^2$
(b) 2.2 N/mm$^2$
(c) 5.5 N/mm$^2$

EXAMPLE 11

A formulation identical to that prepared in Example 1 was used to bond a range of substrates in pairs of the same material, and 3 kg fixture times were determined using a 4 minute open time. The results are listed in Table 7.

TABLE 7

| Substrate | 3 kg Fixture Time |
|---|---|
| Polyvinylchloride | 6.5 |
| Polymethylmethacrylate | 7.5 |
| Polycarbonate | 13.0 |
| Polyacetal | 7.5 |
| Nylon 66. | 6.5 |
| Phenolic | 6.0 |
| Wood (Teak) | 9.0 |
| Glass | 4.0 |
| Glass Filled Polyester | 4.5 |
| Aluminium | 5.5 |
| Brass | 5.0 |
| Copper | 6.0 |
| Galvanised Steel | 11.0 |
| Chrome | 6.0 |

EXAMPLE 12

A formulation comprising diallyl diglycol carbonate (5.28 g) and the tetra ester of thiopropionic acid and pentaerythritol (4.72 g), acrylic acid (0.5 g), 0.3% vanadium acetyl acetonate in methyl methacrylate (0.5 g), and N-phenyl-2-propyl-3,5-diethyl-1,2-dihydropyridine (0.5 g) was prepared and spread onto a glass surface as films of thicknesses 0.1 to 0.5 mm in depth. These films cured to solid tack free coatings in air after 20 minutes.

EXAMPLE 13

Using the general procedures outlined in Example 1 a formulation was prepared comprising a silicon diacrylate (EBECRYL 350 supplied by UCB Chemical Sector Speciality Chemicals Division, Belgium) at (10 g), trichloroacetic acid (0.5 g) and N-phenyl-2-propyl-3,5-diethyl-1,2-dihydropyridine (0.5 g). This formulation was packed into a 25 ml aluminium tube under an argon atmosphere and sealed. The formulation was tested as follows; samples squeezed from the tube were spread onto sheets of polyethylene giving film thicknesses of 0.1 to 0.5 mm in depth. On exposure to air the formulations were activated and began to polymerise from the formulation/air interface downwards. The polymerisation reaction was rapid giving a solid rubbery material after 2–3 minutes, with the reaction being even faster for thiner films.

EXAMPLE 14

A series of formulations were prepared comprising hydroxypropylmethacrylate (10 g), acrylic acid (0.5 g), N-phenyl-2-propyl-3,5-diethyl- 1,2-dihydropyridine and 0.5 g methyl methacrylate solution containing 0.3% of the salts listed in Table 8. These formulations were prepared and tested using the procedures outlined in Example 1. Results are listed in Table 8.

TABLE 8

| Salt | 3 Kg. Fixture times (min) |
|---|---|
| Vanadium III Acetylacetonate | 3 |
| Dibutyltin dilaurate | 8 |
| Aluminium III Acetylacetonate | 6 |
| Calcium Chloride | 2.5 |
| Tetra-N-butylammonium bromide | 5.5 |
| Vanadyl Acetylacetonate | 4 |

EXAMPLE 15

A formulation comprising methylmethacrylate (25 g), acrylic acid (25 g), triethyleneglycol-dimethacrylate (5 g), 6% cobalt naphthenate in hydrocarbon oil (0.1 g), was deoxygenated by several freeze/thaw cycles under an inert atmosphere. Following the deoxygenation 0.5 g of a condensation product of urea and 4-methyl-cyclohexanone believed to be the spirolactam of formula XXV

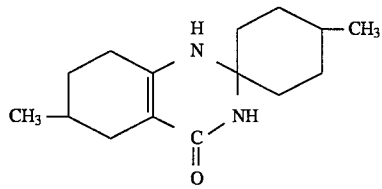

was added under inert atmosphere to give a liquid formulation. Samples of this formulation when exposed to air polymerized with vigorous exotherm after 35 minutes while the remainder of the formulation under the inert atmosphere remained liquid.

EXAMPLE 16

Using the general procedures outlined in Example 1 an adhesive formulation (A) was prepared comprising hydroxypropyl methacrylate (9 g), acrylic acid (1 g) and 5 mg of cobalt iodide and 0.5 g of the condensation product of urea and cyclohexanone. A second formulation (B) was prepared using the same components as formulation (A) except that 10 mg of cobalt iodide was added. Both formulations were stable when stored under argon away from air. The formulations were tested using the procedures outlined in Example 1 and gave the results shown in Table 9.

TABLE 9

| | Open time (minutes) | Bond Strengths Tensile Shear (N/mm²) |
|---|---|---|
| Formulation A | 5 | 4.4 |
| | 10 | 6.2 |
| Formulation B | 5 | 6.0 |
| | 10 | 8.6 |

EXAMPLE 17

Using the procedures outlined in Example 1 an adhesive formulation comprising hydroxypropyl methacrylate (9 g), acrylic acid (1 g), cobalt iodide (50 mg) and 0.5 g of the condensation product of urea and 4-methyl cyclohexanone. The adhesive was stable when stored away from air and gave the following results when activated by exposure to air.

| Open time (minutes) | Bond Strengths (N/mm²) |
|---|---|
| 2 | 5.6 |
| 5 | 6.6 |
| 10 | 5.8 |

EXAMPLE 18

Using the procedures outlined for the above examples, an adhesive formulation comprising hydroxypropyl methacrylate (9 g), acrylic acid (1 g), cobalt iodide (10 mg) and 0.5 g of the condensation product of urea and 3-methyl-cyclohexanone. The adhesive was stable under an inert atmosphere and when activated by exposure to air as in Example 1 the following results were obtained.

| Open time (minutes) | Bond Strengths (N/mm²) |
|---|---|
| 2 | 6.0 |
| 5 | 6.9 |
| 10 | 7.8 |

EXAMPLE 19

An adhesive formulation (19a), comprising hydroxypropyl methacrylate (10 g), 0.3% iron naphthenate in methyl methacrylate (0.5 g), acrylic acid (0.5 g) and N-phenyl-2-propyl-3,5-diethyl-1,2-dihydropyridine (0.5 g) was prepared in an aluminium tube as outlined in Example 1. A second identical formulation (19b) was prepared by a comparable procedure in a glass bottle fitted with a pump action aspirator which allowed the formulation to be dispensed as a fine spray by simply pushing downwards on the aspirator head. The adhesive formulation when applied to a substrate using this aspirator was activated more rapidly giving a shorter fixture time for a given open time (see table below).

| Formulation | Open Time (minutes) | 3 Kg Fixture Time (minutes) |
|---|---|---|
| 19a | 2 | 4 |
| 19b | 2 | 2 |

EXAMPLE 20

An adhesive formulation comprising hydroxypropyl methacrylate (8.5 g), methacrylic acid (0.5 g), N-phenyl-2-propyl-3,5-diethyl-1,2 dihydropyridine (0.5 g) and 0.1% iron (III) acetylacetonate in hydroxypropyl methacrylate (0.5 g) was prepared and tested as in Example 1 with the results presented below. A further set of tests was carried out where the formulation was continuously stirred on the metal substrates with a spatula to deliberately induce oxygen diffusion from the air during the open time intervals. Stirring of the formulation increases both the fixture rates and the bond strengths obtained for a given open time (see below, results for the stirring experiment in brackets).

| Open times (minutes) | Fixture times (minutes) | Bond strengths N/mm² |
|---|---|---|
| 2 | 6 | 12.95 |
| | (3.55) | (18.8) |
| 4 | 4 | 15.8 |
| | (2) | (17.6) |

EXAMPLE 21

An adhesive formulation was prepared as in Example 1 comprising hydroxypropyl methacrylate (5 g), 33% polymethyl methacrylate in methyl methacrylate (5 g), acrylic acid (0.5 g), 0.1% iron naphthenate in hydroxypropyl methacrylate (0.5 g), and N-phenyl-2-propyl-3,5-diethyl-1,2-dihydropyridine (0.5 g). The formulation was tested as in Example 1 except that 0.5 mm wire shims were placed on the bondline to ensure that the adhesive formed a 0.5 mm fillet between the substrates. The adhesive performance with and without stirring (as in previous Example) was again determined with the stirred examples (see below in brackets) showing more rapid fixture rates and improved bond strengths.

| Open times (minutes) | Fixture times (minutes) | Bond strengths N/mm² |
|---|---|---|
| 2 | 10.5 (9.0) | 4.0 (7.8) |
| 4 | 8.5 (7.0) | 6.3 (7.6) |

EXAMPLE 22

An adhesive formulation was prepared using the procedures outlined in Example 1, comprising N-phenyl-2-propyl-3,5-diethyl-1,2-dihydropyridine (0.5 g), hydroxypropyl methacrylate (9.0 g), acrylic acid (0.5 g) and iron (III) acetylacetonate (0.1% solution in hydroxypropyl methacrylate, 0.5 g). The performance of the formulation as an adhesive following air activation as in Example 1 is illustrated in Table 6 below.

TABLE 6

| Open Times (Minutes) | Bond Strengths (N/mm²) | 3 Kg Fixture times (Minutes) |
|---|---|---|
| 2 | 12.4 | 4.0 |
| 4 | 16.9 | 4.0 |
| 6 | 15.9 | 3.0 |
| 10 | 16.0 | 3.5 |

EXAMPLE 23

An adhesive formulation was prepared as in the previous Example with the exception that acrylic acid was replaced by methacrylic acid. The performance of the adhesive was evaluated as for the previous Example. The results are shown in Table 7 below.

TABLE 7

| Open Times (Minutes) | Bond Strengths (N/mm²) | 3 Kg Fixture times (Minutes) |
|---|---|---|
| 2 | 15.4 | 8.0 |
| 4 | 19.4 | 7.0 |

EXAMPLE 24

An adhesive formulation was prepared using the procedures outlined in Example 1, comprising N-phenyl-2-propyl-3,5-diethyl-1,2-dihydropyridine (0.5 g), acrylic acid (0.5 g), hydroxypropyl methacrylate (4.0 g), 4.5 g of a solution of poly(methyl methacrylate) (30%) in methyl methacrylate and iron (III) acetylacetonate (0.1% solution in hydroxypropyl methacrylate, 0.5 g). The performance of the formulation as an adhesive following air activation as in Example 1 is illustrated in Table 8 below.

TABLE 8

| Open Times (Minutes) | Bond Strengths (N/mm²) | 3 Kg Fixture times (Minutes) |
|---|---|---|
| 2 | 8.5 | 4.0 |

TABLE 8-continued

| Open Times (Minutes) | Bond Strengths (N/mm²) | 3 Kg Fixture times (Minutes) |
|---|---|---|
| 4 | 5.8 | 3.5 |
| 6 | 4.0 | 3.0 |
| 10 | 4.4 | 3.0 |

EXAMPLE 25

A series of adhesive formulations 25 (a–g) comprising hydroxypropyl methacrylate (10 g), acrylic acid (0.5 g), N-phenyl-2-propyl-3,5-diethyl-1,2-dihydropyridine (0.5 g) and mixtures of cobalt and iron naphthenate salts dissolved in methyl methacrylate (0.5 g) such that the final total metal concentration for each of the cobalt:iron ratios listed below was 150 parts per million.

| | Co:Fe ratio | Open times (minutes) | Fixture times (minutes) | Bond strengths N/mm² |
|---|---|---|---|---|
| 25.a | 1:0 | 1 | 2.5 | 8 |
| | | 2 | 1.5 | 11.8 |
| | | 4 | 1 | 10 |
| 25.b | 9:1 | 1 | 1.5 | — |
| | | 2 | 0.5 | 11 |
| | | 4 | 0.5 | 7.3 |
| 25.c | 4:1 | 1 | 1.5 | 8.8 |
| | | 2 | 0.5 | 10.5 |
| | | 4 | 0.5 | 9.6 |
| 25.d | 1.5:1 | 1 | 3 | 2.2 |
| | | 2 | 1.25 | 12 |
| | | 4 | 0.5 | 12.5 |
| 25.e | 0.67:1 | 1 | 3.5 | 3.2 |
| | | 2 | 2.5 | 10 |
| | | 4 | 0.5 | 13 |
| 25.f | 0.25:1 | 1 | 6 | 0 |
| | | 2 | 3.5 | 5.5 |
| | | 4 | 0.5 | 12 |
| 25.g | 0:1 | 1 | 6 | 0 |
| | | 2 | 4 | 7 |
| | | 4 | 1 | 11 |

The results for compositions b and c, as compared to composition a, show that the introduction of a minor proportion of the iron salt reduced the fixture time following each of the open times without destroying the bond strength. The results for composition d after open times of 2 or 4 minutes are similar. The synergistic effect is lost as the proportion of iron increases.

EXAMPLE 26

An adhesive formulation was prepared using the procedures outlined in Example 1 containing hydroxypropyl methacrylate (7.9 g), acrylic acid (0.5 g), 0.1% cobalt naphthenate in hydroxypropyl methacrylate (1.0 g), 0.1% iron (III) acetylacetonate in hydroxypropyl methacrylate (0.1 g) and 1,2,3,4 tetrahydroquinoline (0.5 g). The formulation when air activated according to Example 1 gave the following results.

| Open times (minutes) | Bond strengths N/mm² |
|---|---|
| 5 | 4.7 |
| 10 | 5.2 |

EXAMPLE 27

An adhesive formulation was prepared as in the previous example containing hydroxypropyl methacrylate (7.75 g), acrylic acid (0.5 g), 0.1% cobalt naphthenate in hydroxypropyl methacrylate (1 g), 0.1% iron (III) acetylacetonate in hydroxypropyl methacrylate (0.25 g) and 1,2,3,4 tetrahydroquinoline (0.5 g). The formulation when tested as in Example 1 gave the following results.

| Open times (minutes) | Bond strengths N/mm² |
|---|---|
| 5 | 5.3 |
| 10 | 7.5 |

EXAMPLE 28

An adhesive formulation prepared and tested as in Example 1 containing hydroxypropyl methacrylate (8.15 g), saccharin (0.5 g), 0.1% cobalt naphthenate in hydroxypropyl methacrylate (1 g), 0.1% iron (III) acetylacetonate in hydroxypropyl methacrylate (0.25 g) and 1,2,3,4 tetrahydroquinoline (0.5 g) gave bond strengths of 3.3 N/mm² after 24 hours following air activation for 5 minutes.

EXAMPLE 29

A formulation comprising styrene (9 g), Atlac 382E (a commercially available propoxylated bisphenol A fumarate polyester resin supplied by Atlas Chemical Industries) (11 ), acetic acid (0.5 g), 0.1% cobalt naphthenate in styrene (0.5 g) and N-phenyl-2-propyl-3,5-diethyl-1,2 dihydropyridine (0.5 g) was prepared in air and gelled after 4–5 minutes exposure to air, giving a hard solid within 30 minutes.

EXAMPLE 30

A formulation comprising N-vinyl pyrrolidone (6 g), Atlac 382E (3 g), 0.1% cobalt naphthenate in N-vinyl pyrrolidone (0.1 g), acetic acid (0.5 g) and N-phenyl-2-propyl-3,5-diethyl-1,2-dihydropyridine (0.5 g) was prepared in air and gelled to a solid polymer within 30 minutes.

EXAMPLE 31

A formulation comprising hydroxypropyl methacrylate (8.5 g), acrylic acid (0.5 g), 0.1% cobalt naphthenate in hydroxypropyl methacrylate (0.5 g) and ethyl-2,4-dimethyl-1,4-dihydronicotinate (0.5 g) was prepared and tested as in Example 1 giving bond strengths 2.9 MPa following air activation for 10–15 minutes.

EXAMPLE 32

A formulation comprising triethylene glycol dimethacrylate (4.5 g), hydroxypropyl methacrylate (4.5 g), acrylic acid (0.5 g), 0.1% cobalt naphthenate in hydroxypropyl methacrylate (0.5 g) and 2,5 dimethyl pyrrole (0.5 g) was prepared as in Example 1. A sample of this formulation polymerised to a gel within 15 minutes on exposure to air.

EXAMPLE 33

Formulations were prepared containing

| | |
|---|---|
| Hydroxypropyl methacrylate | 10 g |
| Acrylic acid | 0.5 g |
| N-Phenyl-2-propyl-3,5-diethyl-1,2-dihydropyridine | 0.5 g |
| Iron naphthenate (as indicated below in parts per million) | |

Each formulation was tested for stability at room temperature (RT). Each formulation was also exposed to air for 2 minutes prior to bond assembly with grit-blasted mild steel laps as in Example 1, with the following results:

| Iron Conc. (ppm) | Fixture time (Min) | RT Stability (hours) |
|---|---|---|
| (a) 0 | 7.5 | 1–2 |
| (b) 15 | 4.5 | >200 |
| (c) 150 | 3.5 | >200 |
| (d) 1500 | >1600 | — |
| (e) 15000 | >1600 | — |

When no iron was present the formulation was air activatable but had poor room temperature stability. High levels of iron gave formulations that could no longer be regarded as air sensitive. There is a range of metal concentration where both activity and stability are at a maximum.

EXAMPLE 34

(a) A formulation comprising cyclohexyl methacrylate (10 g), 6% cobalt naphthenate in hydrocarbon oil (0.5 g), and (0.1 g) of the condensation product of urea and 4-methyl cyclohexanone believed to be the spirolactam XXV, was prepared in air in a polypropylene beaker. This formulation polymerised with an exotherm after 40 minutes.

(b) A formulation similar to (a) above containing 0.3 g of the spirolactam XXV polymerises with an exotherm after 30 minutes.

(c) A formulation similar to (a) above containing 0.5 g of the spirolactam XXV polymerises with an exotherm after 20 minutes.

These formulations are air-activatable without acid.

We claim:

1. A storage stable, one-part, air-activatable, polymerisable composition comprising:

(a) at least one free-radially polymerisable ethylenically unsaturated monomer, and (b) an activator systems for effective polymerisation of the free-radically polymerisable ethylenically unsaturated monomer, said activator system comprising at least one compound which is auto-oxidisable when exposed to air and which, after exposure to air, is capable of effecting polymerisation of the free-radically polymerisable ethylenically unsaturated monomer, said auto-oxidisable compound is of the general formula II:

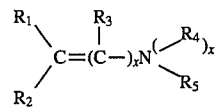

II where x is 0 or 1 with the provisos that:

when x=0, the nitrogen atom in structure II is not bonded to a second nitrogen atom; and when x=1, the >C=C< moiety resulting therefrom does not form part of a phenyl ring;

and $R_1$, $R_2$, $R_3$, $R_4$ and $R_5$, which may be the same or different, are independently selected from hydrogen, substituted and unsubstituted hydrocarbyl groups, substituted and unsubstituted heterohydrocarbyl groups and substituted and unsubstituted silyl groups, and any two of the groups $R_1$ to $R_5$ may together form a substituted or unsubstituted mono-cyclic ring structure or a substituted or unsubstituted poly-cyclic ring structure, which may be a fused ring structure, wherein
the term "substituted" refers to the appropriate group substituted with one or more groups comprising oxygen, nitrogen, sulfur or halogen atoms and
the term "heterohydrocarbyl" refers to hydrocarbyl interrupted by an oxygen, nitrogen or sulfur atom,
with the proviso that none of the groups $R_1$ to $R_5$ comprise or contain a group which is known to interfere with polymerisation, said activator system comprising said auto-oxidisable compound alone or in combination with a weak acid,
with the further provisos that
the composition does not contain a peroxide, or a peroxide precursor which produces peroxide in the absence of air, or any ingredient which is a significant source of radicals in the absence of air;
said activator system having been combined with said polymerisable monomer under anaerobic conditions; and
said polymerisable composition being maintained and stable under said anaerobic conditions and polymerisable under aerobic or anaerobic conditions after exposure to air.

2. A composition according to claim 1 wherein $R_2$ and $R_5$ form a ring structure such that the auto-oxidizable compound has the general formula I.A.

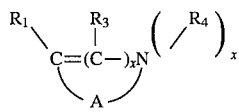

IIa wherein A is a substituted or unsubstituted divalent hydrocarbyl or substituted or unsubstituted heterohydrocarbyl group, substituted or unsubstituted a divalent hydrocarbyl or heterohydrocarbyl group having a cycloaliphatic or aromatic ring fused thereto.

3. A composition according to claim 1 wherein $R_1$ and $R_3$ form a ring structure.

4. A composition according to claim 1 wherein one or more of $R_1$ to $R_5$ are hydrocarbyl groups selected from:
 (I) straight chain or branched aliphatic groups:
 (ii) aromatic groups.

5. A composition according to claim 1 wherein one or more of R1 to R5 is a heterohydrocarbyl group.

6. A composition as claimed in claim 1 wherein one or more of $R_1$ to $R_5$ is a substituted hydrocarbyl or heterohydrocarbyl group.

7. A composition as claimed in claim 1 wherein the auto-oxidizable compound is selected from the group consisting of partially hydrogenated pyridines, condensation products of cyclic ketones and ureas, Schiff's bases, indoles, pyrroles, imidazoles, piperazines, carbazoles and tetrahydroquinolines.

8. A composition as claimed in claim 1 wherein the auto-oxidisable compound is a dihydropyridine having a general formula selected from III:

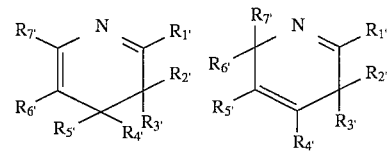

III (i)   III (ii)

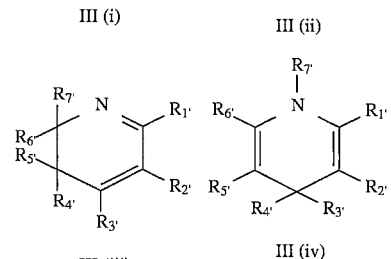

III (iii)   III (iv)

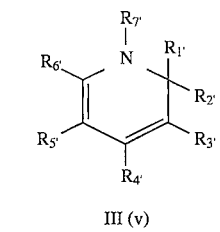

III (v)

wherein $R_1'$ to $R_7'$ are as defined for $R_1$ to $R_5$ in claim 2.

9. A composition as claimed in claim 1 wherein the auto-oxidizable compound is a Schiff's Base having the formula IIIb:

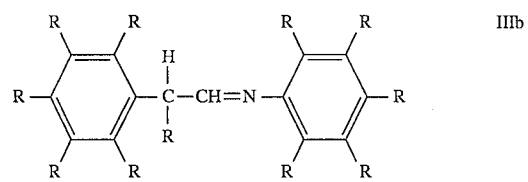

IIIb wherein the R's, which may be the same or different, are selected from hydrogen and substituted or unsubstituted alkyl, substituted or unsubstituted alkoxy or substituted or unsubstituted aromatic groups.

10. A composition as claimed in claim 1 wherein the auto-oxidisable compound is selected from the group consisting of:
N-butyl-2-propyl-3,5-diethyl-1,2-dihydropyridine,
N-phenyl-2-propyl-3,5-diethyl-1,2-dihydropyridine,
N-(4'-methoxy phenyl)-2-propyl-3,5-diethyl-1,2-dihydropyridine,
N-(cyclohexyl)-2-propyl-3,5-diethyl-1,2-dihydropyridine,
N-benzyl-1,4-dihydronicotinamide,
ethyl-2,4-dimethyl-1,4-dihydronicotinate,
N-trimethylsilyl-1,4-dihydropyridine,
1,4-dihydropyridine,
5-methoxy-2,3-dimethylindole,
5-methoxy-2-phenyl-3-methylindole,
2,3-dimethylindole,
2,5-dimethylpyrrole,
2,4-dimethylpyrrole,
2,4-dimethyl-3-ethylpyrrole,
2,4,5-triphenylimidazole,
1-benzyl-2,3-diphenyl dehydropiperazine,
3,4,5,6-tetrahydracarbazole,
1,2,3,4-tetrahydroquinoline, a Schiff's Base having the formula XIX

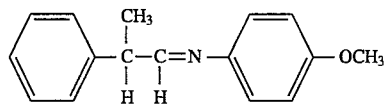

$\Delta^{10}$ Dodecahydroacridine,
$\Delta^{19}$ Octahydroquinoline,
2-methyl-3-phenyl-3,4,5,6-tetra-hydropyridine,
2-benzyl-3-phenyl-3,4,5,6-tetrahydropyridine,
and a compound having the formula XXV:

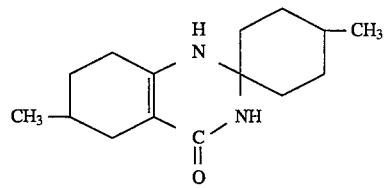

11. A composition as claimed in claim 1 wherein the auto-oxidizable compound is a spirolactam of the formula XXIV:

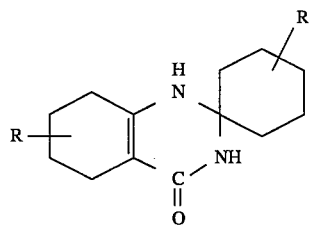

wherein the R's which may be the same or different are selected from hydrogen and substituted or unsubstituted alkyl, substituted or unsubstituted alkoxy, or substituted or unsubstituted aromatic groups.

12. A composition as claimed in claim 2 wherein $R_1$ and $R_3$ form a ring structure.

13. A composition according claim 1 wherein the weak acid is present and has a pKa of between 0.5 and 13.

14. A composition as claimed in claim 13 wherein the weak acid is a carboxylic acid.

15. A composition as claimed in claim 1 additionally comprising one or more soluble ionic salts.

16. A composition as claimed in claim 15 wherein the ionic salt or salts are selected from transition metal salts.

17. A composition as claimed in claim 16 wherein the transition metal salt or salts are selected from salts of cobalt, iron, manganese and vanadium.

18. A composition as claimed in claim 15 wherein the soluble ionic salt is selected from the group consisting of vanadium III acetylacetonate, dibutyltin dilaurate aluminium III acetylacetonate, calcium chloride, tetra-N-butylammonium bromide and vanadyl acetylacetonate.

19. A composition as claimed in claim 15 wherein the soluble ionic salt or mixture of salts is present in the composition in a range of between about 1 to about 1,000 parts per million.

20. A composition as claimed in claim 1 comprising 0.1 to 20% by weight of the auto-oxidisable compound and at least 10% by weight of the free-radically polymerisable ethylenically unsaturated monomer, optionally with the soluble ionic salt, thickeners, fillers, pigments, reducing agents and/or stabilisers, the total constituents adding up to 100%.

21. A composition according to claim 1 wherein the auto-oxidisable compound is a condensation product of urea and a cyclic ketone, having the general formula IIIa:

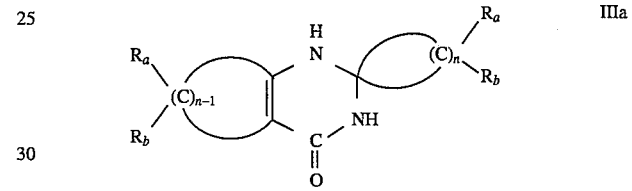

wherein n=4, 5, 6, or 7, and $R_a$ and $R_b$ are as defined for $R_1$ to $R_5$.

22. A composition according to claim 1 wherein the free-radically polymerisable ethylenically unsaturated monomer is selected from the groups consisting of acrylates, methacrylates, styrene, maleate esters, fumarate esters, n-vinyl pyrollidone, unsaturated polyester resins, alkyd resins, thiol-ene compositions, and acrylated, methacrylated, vinyl, or allyl terminated resins.

23. A composition according to claim 20 further comprising from 0.1 to 20% by weight of a weak acid.

* * * * *